United States Patent Office 3,298,177
Patented Jan. 17, 1967

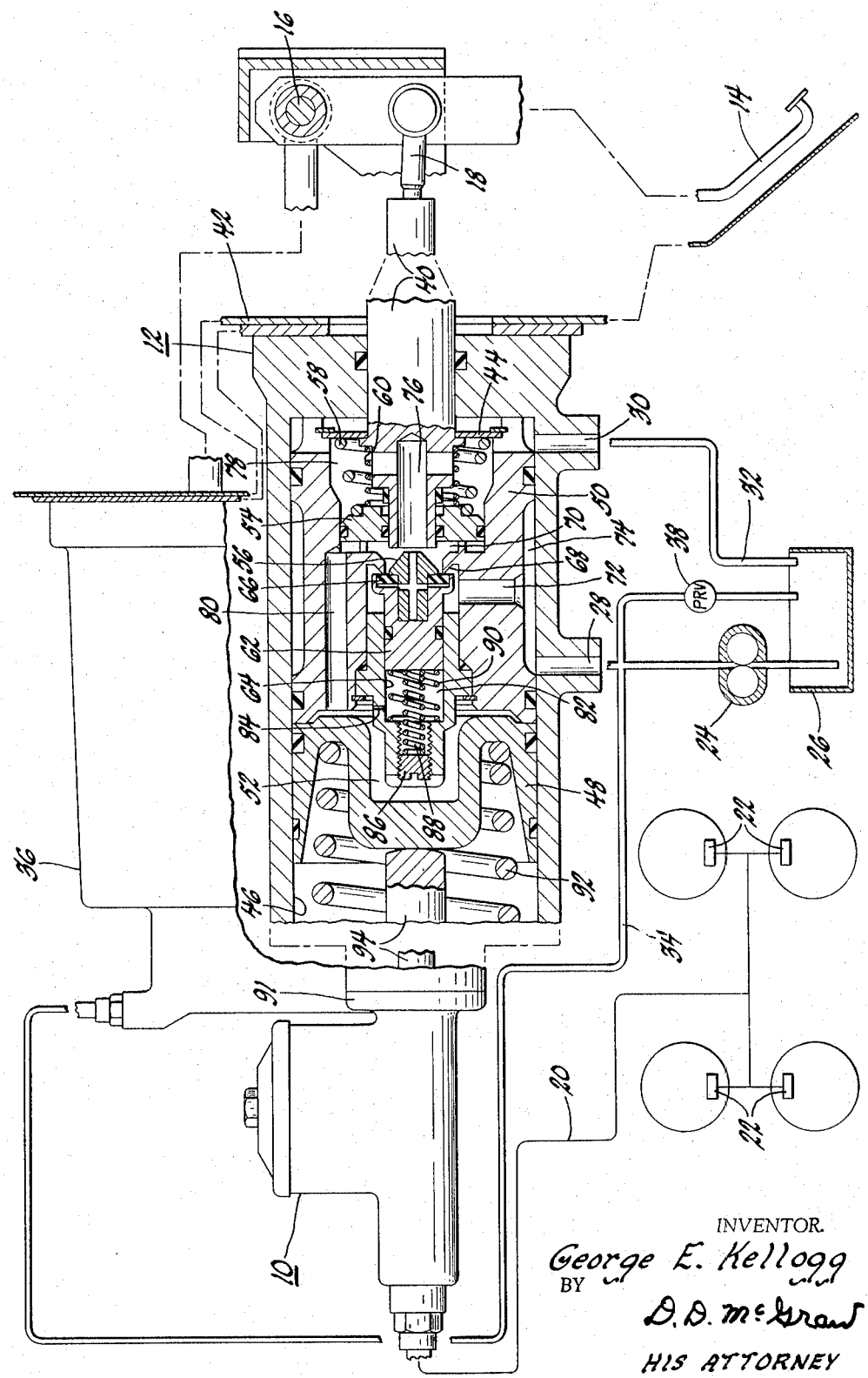

3,298,177
HYDRAULIC POWER BRAKE BOOSTER HAVING EXCESS FORCE DAMPENING MEANS
George E. Kellogg, Miamisburg, Ohio, assignor to General Motors Corporation, Detroit, Mich., a corporation of Delaware
Filed July 8, 1964, Ser. No. 381,199
2 Claims. (Cl. 60—54.5)

This invention relates to brake booster mechanisms and more particularly to a valving arrangement which prevents overtravel of a hydraulically operated power booster mechanism during panic braking conditions.

Brake booster mechanisms of present-day hydraulic power operated design provide a great amount of force multiplication for brake actuation. An operator may have occasion to depress the brake pedal with great force during emergency situations, and in doing so may provide more force than necessary to stop the rotating wheels. This very forceful brake actuation may under some conditions lock the wheels against rotation and can put adverse pressures on the braking system. Since vacuum power boosters commonly in use have a lower power run-out, they do not generate brake system pressures of a similar magnitude. It is, therefore, desirable to provide means for dampening or resisting sudden high hydraulic pressure demands put on a hydraulic power booster mechanism in excess of that required to operate the vehicle brakes. Some ways to avoid the problem and thereby accomplish the desired result include the use of a high rate spring resisting booster control valve power apply movement and to use a hydraulic dashpot which will impede rapid power apply movement of the booster control valve.

It is an object of the present invention to provide an improved hydraulic power booster mechanism for hydraulically operated vehicle brakes which dampens the excessive force put on such a mechanism by a vehicle operator.

It is another object of the present invention to provide an improved power booster mechanism for hydraulically operated vehicle brakes which is compatible with hydraulic power boosters of common design.

It is still another object of the present invention to provide an improved power booster mechanism for hydraulically operated vehicle brakes which is integral to the power booster unit and tends to resist excessive force put on the braking system.

A further object of this invention is to provide an improved power booster mechanism for hydraulically operated vehicle brakes which includes a high-rate spring resisting valve movement in addition to a hydraulic dashpot arrangement to impede the sliding motion of a hydraulic boost pressure controlling valve in the power booster mechanism.

Further objects and advantages of the invention will be apparent from the following description, reference being had to the accompanying drawing wherein a preferred embodiment of the present invention is clearly shown.

In the single figure drawing, a hydraulic braking system and hydraulically powered booster arrangement therefor is diagrammatically shown with parts of the power booster mechanism broken away and in section to illustrate the invention.

The invention is illustrated in an operative environment which includes a master cylinder 10 pressurizable by a power booster generally designated by the numeral 12. The power booster 12 is actuated by force being placed on a pivotally mounted brake pedal 14 adapted to rotate pendantly about a pivot 16. A push rod 18 pivotally engages the pedal 14 and is operatively connected to the power booster mechanism in a manner to be hereinafter described.

The master cylinder 10 is arranged to provide hydraulic pressure through lines 20 to a plurality of vehicle wheel brakes 22. A hydraulic pump 24 pumps fluid from a reservoir 26 through an inlet 28 in the power booster 12 and an outlet 30 from the power booster 12 returns the pumped fluid through a conduit 32 to the reservoir 26. The hydraulic pump 24 also provides hydraulic pressure through a condiut 34 to a power unit 36 which serves as a pedal raising mehcanism during operating conditions when hydraulic pressure is lost to the booster system. A regulating valve 38 maintains the pressure output of the pump at a designed level. It is understood that the braking arrangement just described does not form any portion of the present invention except as it acts in combination with the invention and is meant only to provide an operative environment for the invention to more clearly illustrate its operation.

Referring now to the power booster 12 shown in section in the drawing, the push rod 18 operatively engages a valve driver 40 in any well-known manner. The valve driver 40 passes through a firewall 42 and is slidable in a retainer 44 disposed near one end of the power booster 12. The wall of bore 46 in the power booster 12 slidably supports a power piston 48 and valve support means 50. Between the power piston 48 and the valve support means 50 is formed a power chamber 52. The valve driver 40 is slidably disposed through a reaction member 54 and is adapted to penetrate therethrough during operation of the valve until it contacts a valve face 56. A counter-reaction spring 58 is disposed between the retainer 44 and a portion of the reaction member 54 to maintain a spaced distance therebetween. The valve driver 40 is biased away from reaction member 54 by a return spring 60.

A valve piston 62 is slidably disposed in a bore 64 formed within the valve support means 50. The valve piston 62 carries a resilient member 66 that is adapted to come into contact with a valve seat 68 during periods of time when no force is being exterted on piston 62 by the valve driver 40. A space existing between the reaction member 54, the valve piston 62 and a portion of the valve support means 50 is herein referred to as a reaction chamber 70. A passage 72 serves as pressure communication means between the reaction chamber 70 and a fluid receiving chamber 74 circumferentially disposed on the periphery of the valve support means 50. The reaction chamber 70 also freely communicates during portions of the cycle of the power booster with a passage 76 formed in the center of the valve driver 40. The passage 76 communicates with the exhaust chamber 78 which in turn communicates with the outlet 30. The reaction chamber 70 also freely communicates with a passage 80 through the valve support means 50 which leads to the power chamber 52.

A dashpot chamber 82 is formed behind the slidable valve piston 62 in the bore 64 and communicates with the power chamber 52 through an orifice 84.

The valve piston 62 is maintained away from an adjuster 86 by a high-rate spring 88 which functions in a manner to be hereinafter described. A lower rate spring 90 acts as a return spring for the valve piston 62 after an actuation of the power booster.

The power piston 48 is maintained away from a wall 91 of the power booster 12 by piston return spring 92. A push rod 94 extends from the master cylinder 10 and abuts the power piston 48. Therefore, any movement of the power piston 48 during the compression of the spring 92 will transmit a force through the push rod 94 into the master cylinder 10 displacing fluid therein into the lines 20 in a conventional manner.

In operation a force is exerted on the brake pedal 14 by the operator of a vehicle. The pedal pivots about the point 16 towards the booster assembly 12 and carries the push rod 18 and the engaged valve driver 40 towards the valve 56. As the cylindrical end of the valve driver 40 forming an opening in the passage 76 contacts the valve face 56, the path for exhausing of the hydraulic pressure from the pump 24 is blocked. Further movement of the valve drive member 40 will drive the valve piston 62 and the resilient member 66 carried by the valve piston off the valve seat 68. It should be noted that any movement of the valve piston 62 is against the biasing force of the spring 88, the spring 90 and the hydraulic fluid in the dashpot chamber 82 attempting to escape through the bleed orifice 84. At the same time, fluid ressure is transmitted to the passage 80 and the reaction chamber 70. Pressure acting against the face of the reaction member 54 immediately generates a force acting against the bias of the counter-reaction spring 58 and the return spring 60. The counter-reaction spring 58 will fully offset the force in the reaction chamber against the face of reaction member 54 until spring 58 yields, after which a portion of the force will be transmitted to valve driver 40 through spring 60. As the resilient member 66 is driven from its seat 68, fluid pressure is also communicated through the passage 80 into the power chamber 52. When sufficient pressure build-up behind the power piston 48 takes place which will offset the force of the spring 92, a force is exerted against the push rod 94. As previously described, the push rod 94 operates the master cylinder in a conventional manner and fluid pressure will be felt at the wheel brakes 22.

As force is eased from the brake pedal 14, a combination of the force of the return spring 60 and the trapped pressure in the power chamber 52 will drive the valve driver out of sealing engagement with the valve face 56 thereby allowing the pressure in the power booster to bleed through the passage 76 into the exhaust chamber 78 and out of the outlet 30 back to the reservoir. At the same time that the foregoing sequence of events takes place, the spring 90 also drives the valve piston 62 rightwardly in the bore 64 until the resilient member 66 comes into sealing engagement with the valve seat 68. Further pressure transmission beyond valve seat 68 from the pump 24 ceases and the power booster arrangement is poised for another actuation.

It is obvious that very little force on the brake pedal 14 will bring about the previously described sequence of operations and great force could very quickly be put on the power piston 48 and, consequently, the master cylinder 10. A vehicle operator under some conditions may apply the brakes too rapidly thereby causing the wheels to slide due to the quick pressure build-up in the power booster. A surge of hydraulic pressure may also cause damage to the brake system components. One of the ways in which the likelihood of this occurring in the system may be decreased is by the provision of spring 88 causing a delay or a reistance to a quick shift of the valve piston 62 during actuation and also the hydraulic fluid normally present in the dashpot chamber 82 will be bled through the bleed orifice 84 slower than the valve piston 62 can be shifted by the valve driver 40. Therefore, a slight delay in the operation of the valve piston will take place and, consequently, a great force build-up in the system in an undesirably short period of time is reduced to a desirable level. It is obvious that, if the amount of force exerted on the foot pedal is the amount of force necessary to stop the vehicle, the dashpot chamber will eventually drain through the bleed orifice and the force against the spring 88 will be overcome and the valve piston 62 will be shifted into a maximum pressure communicating disposition. However, the delay provided is sufficient to eliminate unintentional power surges.

This type of arrangement has particular utility in an environment where a hydraulic power booster utilizing either pressurized hydraulic fluid or some other power medium is utilized to prevent the further rotation of the vehicle wheels. This slight delay in the reaction of the system is also advantageous in that it provides a feel for the operator under severe braking conditions and therefore is a safety feature of the braking system as a whole.

While the embodiment of the present invention as herein disclosed constitutes a preferred form, it is understood that other forms might be adopted.

What is claimed is as follows:

1. Hydraulic power brake booster mechanism for a hydraulic master cylinder adapted to supply fluid pressure to a vehicle braking system, said brake booster mechanism comprising a hydraulic pressure power source; power operable means having an output portion and operatively connected to said power source and adapted to intensify an applied force to said hydraulic master cylinder; and valve means including a spring loaded piston adapted to selectively route pressure from said power source to the hydraulic master cylinder in response to an applied force, said valve means including a piston slidable in a dashpot chamber, said chamber having a bore for controlling the transmission of force from said power source to the output portion of the power operable means, the pressure from said power source acting against the bias of a resilent member through means in the bore to dampen surges in pressure from the applied force thereby preventing overtravel of the valve means during operation thereof.

2. Hydraulic power brake booster mechanism for a hydraulic master cylinder adapted to supply fluid pressure to a vehicle braking system, said brake booster mechanism comprising: a hydraulic pressure power source; power operable means including an output portion and being operatively connected to said power source and adapted to intensify an applied force to said hydraulic master cylinder; and valve means slidably disposed within said power operable means and responsive to an applied force to intensify the resulting force acting on the hydraulic master cylinder, said valve means including a bore, a piston slidably disposed in said bore including a portion external to said bore adapted to selectively route hydraulic pressure from said power source to said power operable means, and spring means disposed against one side of the slidable piston for restraining the sliding movement of said piston in the bore, said valve means including a chamber normally filled with hydraulic fluid disposed on the side of the piston on which the spring means is disposed including an orifice leading therefrom into another portion of the power operable means being adapted to co-act with the spring means to dampen a pressure surge applied to the power operable means thereby preventing overtravel of the valve means during operating conditions where overtravel is likely.

References Cited by the Examiner

UNITED STATES PATENTS

| | | | |
|---|---|---|---|
| 2,130,799 | 9/1938 | Hofstetter | 60—52 X |
| 2,544,042 | 3/1951 | Pontius | 60—54.6 |
| 2,761,427 | 9/1956 | Shumaker | 91—373 |
| 2,775,957 | 1/1957 | Anderson | 91—372 |
| 2,903,855 | 9/1959 | Randol | 60—52 X |
| 3,015,213 | 1/1962 | Augustin | 60—54.6 |
| 3,035,551 | 5/1962 | Rike | 60—54.6 X |
| 3,091,086 | 5/1963 | Schwartz et al. | 60—52 X |
| 3,132,567 | 5/1964 | Ingres et al. | 91—369 |
| 3,143,926 | 8/1964 | Stelzer | 91—370 X |
| 3,165,031 | 1/1965 | Rockwell | 91—369 |

MARTIN P. SCHWADRON, *Primary Examiner.*

ROBERT R. BUNEVICH, *Examiner.*